(12) United States Patent
Altwies et al.

(10) Patent No.: US 10,408,331 B2
(45) Date of Patent: Sep. 10, 2019

(54) MODULAR TRANSMISSION SIDE COVER ASSEMBLY

(71) Applicant: ILLINOIS TOOL WORKS INC., Glenview, IL (US)

(72) Inventors: Eugene W. Altwies, Burlington, WI (US); Vladimir Rnjak, Lake Geneva, WI (US); Vanessa Peplowski, Hebron, IL (US); Joseph Davis, Archibold, OH (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 15/738,987

(22) PCT Filed: Jul. 20, 2016

(86) PCT No.: PCT/US2016/043049
§ 371 (c)(1),
(2) Date: Dec. 21, 2017

(87) PCT Pub. No.: WO2017/015319
PCT Pub. Date: Jan. 26, 2017

(65) Prior Publication Data
US 2018/0172136 A1    Jun. 21, 2018

Related U.S. Application Data

(60) Provisional application No. 62/194,871, filed on Jul. 21, 2015.

(51) Int. Cl.
*F16H 57/02* (2012.01)
*F16H 57/04* (2010.01)
(Continued)

(52) U.S. Cl.
CPC ....... *F16H 57/031* (2013.01); *F16H 57/0402* (2013.01); *F16H 57/042* (2013.01);
(Continued)

(58) Field of Classification Search
CPC ............... F16H 57/031; F16H 57/0402; F16H 57/0412; F16H 57/0413; F16H 57/0415;
(Continued)

(56) References Cited

U.S. PATENT DOCUMENTS 2,499,798 A * 3/1950 Trail ...................... F16N 39/06
184/13.1
2,577,188 A * 12/1951 Hall ....................... F01M 5/002
184/104.2
(Continued)

FOREIGN PATENT DOCUMENTS

DE    102009037548 A1    4/2011
GB       2352806 A       2/2001
JP       08014368 A  *   1/1996  ......... F16H 57/0413

*Primary Examiner* — Adam D Rogers
(74) *Attorney, Agent, or Firm* — Quarles & Brady LLP

(57) ABSTRACT

A transmission side cover assembly includes a transmission side cover carrying completely there on one or more filters and/or a cooler. Fluid flow channels are formed integrally in the material of the cover and provide fluid flow communication paths to the filters and/or cooler carried by the cover. The filters and/or cooler carried by the cover are accessible externally of the cover, for servicing thereof without removing the cover.

20 Claims, 6 Drawing Sheets

(51) Int. Cl.
*F16H 57/031* (2012.01)
*F01M 11/00* (2006.01)

(52) U.S. Cl.
CPC ..... *F16H 57/0412* (2013.01); *F16H 57/0417* (2013.01); *F01M 2011/0025* (2013.01); *F01M 2011/0029* (2013.01)

(58) Field of Classification Search
CPC ............. F16H 57/0416; F16H 57/0417; F16H 57/042; F16H 57/0421; F16H 57/0423; F16H 57/0424; F16H 2057/02043; F16D 3/84; F01M 2011/0025; F01M 2011/0029; F01M 2011/0033
See application file for complete search history.

(56) References Cited

U.S. PATENT DOCUMENTS

| | | | | |
|---|---|---|---|---|
| 3,792,727 | A * | 2/1974 | Stephenson | B60K 11/00 165/172 |
| 5,090,946 | A * | 2/1992 | Futami | F16H 7/08 474/104 |
| 5,678,461 | A * | 10/1997 | Stine | F01P 3/20 184/6 |
| 5,863,424 | A * | 1/1999 | Lee | B01D 29/07 210/167.02 |
| 6,013,179 | A * | 1/2000 | Laughlin | B01D 29/07 210/172.1 |
| 6,058,898 | A * | 5/2000 | Freese, V | F01M 11/0004 123/195 C |
| 6,217,758 | B1 * | 4/2001 | Lee | F01M 11/0004 210/167.06 |
| 6,830,096 | B1 * | 12/2004 | Fett | F16H 57/0412 165/104.21 |
| 7,637,337 | B2 * | 12/2009 | Stranges | F01M 11/0004 180/69.1 |
| 8,113,167 | B2 * | 2/2012 | Jessberger | F01M 11/0004 123/196 R |
| 8,186,328 | B2 * | 5/2012 | Kiemlen | F01M 5/002 123/196 AB |
| 8,312,857 | B2 * | 11/2012 | Jessberger | F01M 11/0004 123/195 C |
| 8,336,515 | B2 * | 12/2012 | Jainek | F01M 11/0004 123/196 AB |
| 8,414,766 | B2 * | 4/2013 | Mordukhovich | F01M 1/10 210/167.04 |
| 8,590,424 | B2 * | 11/2013 | Nonomura | F16H 57/0402 184/6.12 |
| 9,016,356 | B2 * | 4/2015 | Hollweck | F01M 5/002 165/157 |
| 9,163,716 | B2 * | 10/2015 | Chudy | F16H 57/0483 |
| 9,360,262 | B2 * | 6/2016 | Kim | F28F 27/02 |
| 9,920,829 | B2 * | 3/2018 | Zottele | F16H 57/0417 |
| 2004/0177827 | A1 * | 9/2004 | Hoyte | F01M 11/0004 123/196 AB |
| 2008/0257625 | A1 | 10/2008 | Stranges | |
| 2013/0248292 | A1 * | 9/2013 | Mordukhovich | F16N 39/00 184/6.5 |
| 2017/0051821 | A1 * | 2/2017 | Long | F16H 57/0412 |

* cited by examiner

MODULAR TRANSMISSION SIDE COVER ASSEMBLY

CROSS-REFERENCE TO RELATED APPLICATIONS

The present application claims the benefits of U.S. Provisional Application Ser. No. 62/194,871, filed Jul. 21, 2015.

FIELD OF THE INVENTION

The present invention relates generally to automatic transmissions, and, more specifically, to housings or covers for automatic transmissions; and to the arrangements of components in automatic transmissions.

BACKGROUND OF THE INVENTION

It is known to provide automatic transmissions with housings or covers of steel or plastic which have little or no functionality other than to enclose or cover the various components of the automatic transmission, such as the valve body, suction filter and automatic transmission fluid in the transmission. As a result, even when performing routine service procedures on an automatic transmission, it is necessary to partially disassemble the automatic transmission by first removing a cover or covers thereof to gain access to components therein for performing service or routine maintenance operations. For example, replacing the suction transmission fluid filter requires first removing a pan or cover to expose the filter, then extracting the old filter and installing a new filter and finally reinstalling the pan or cover over the filter. As can be appreciated, simple, routine service or maintenance operations are made more difficult, complicated, time consuming and expensive by the arrangements of components that require disassembly by first removing or disassembling the cover or housing just to gain access to replaceable components, such as filters. Accordingly, it is desirable to provide an automatic transmission design that is efficient and accessible, to facilitate the performance of routine servicing procedures for the transmission.

It is known further to provide transmission fluid conduits or lines as distinct elements or features from one component of the automatic transmission to another component of the automatic transmission. Accordingly, the overall transmission assembly can become bulky in design, simply to provide sufficient space to accommodate the network of transmission fluid conduits. As a result of the sizes of automatic transmissions, automobile designers have been limited in the placement of such transmissions. Accordingly, it is desirable to minimize the size of an automatic transmission to the extent possible, to facilitate the design and placement thereof in an overall vehicle assembly to promote operating efficiency as well as aesthetics.

Accordingly, it is desirable to provide a more efficient design for automatic transmissions, and particularly for the housing components of automatic transmissions, to minimize the overall size of the automatic transmission and to improve accessibility to functional components of the automatic transmission, and especially to service components that are replaced at routine service intervals.

SUMMARY OF THE INVENTION

The modular transmission side cover assembly disclosed herein provides direct access to service components, such as pressure and suction filter elements, without removing transmission housing covers; and provides the placement of service components in readily accessible locations. Further, the modular transmission side cover assembly includes integral, i.e. molded in transmission fluid paths through the side cover between at least some of the components in the automatic transmission assembly.

Other features and advantages of the invention will become apparent to those skilled in the art upon review of the following detailed description, claims and drawings in which like numerals are used to designate like features.

Figure 1:
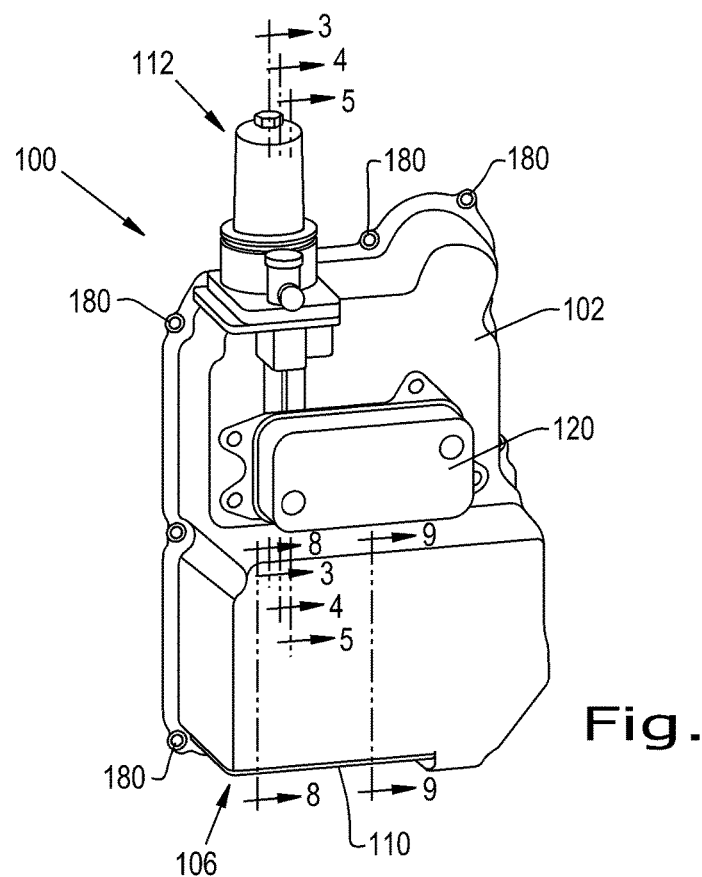
FIG. 1 is a perspective view of a modular transmission side cover assembly as disclosed herein.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more particularly to the drawings, FIG. 1 shows a modular transmission side cover assembly 100, including a plastic side cover 102 that provides external accessibility to several components of an automatic transmission. It will be understood by those skilled in the art that side cover assembly 100 is a subassembly of an overall automatic transmission and includes only some of the components of the automatic transmission. Accordingly, side cover assembly 100 attaches directly to and operatively couples with another subassembly, or other subassemblies of the automatic transmission, such as an automatic transmission valve body, for which it is designed.

Figure 2:
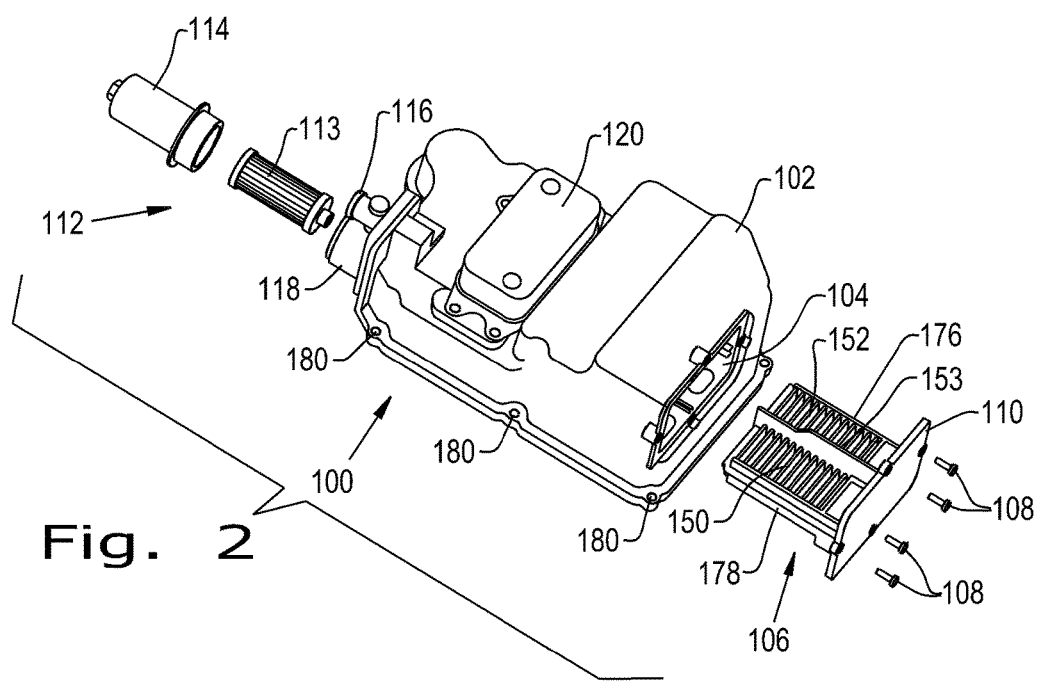
FIG. 2 is a partially exploded view of the modular transmission side cover assembly shown in FIG. 1.

With reference now also to FIG. 2, side cover 102 defines a suction side filter compartment 104, which is a sump or well for receiving therein a suction side filter body 106. Suction side filter body 106 is held in suction side filter compartment 104 by four machine screws 108. Screws 108 extend through a filter element flange 110 of filter body 106, and are threadedly received in side cover 102. Accordingly, the suction side filter body 106 is externally accessible relative to cover 102 so that filter body 106 can be replaced by simply removing the four machine screws 108, withdrawing the used/dirty filter body 106 and replacing it with a new/clean filter body 106. Suction side filter body 106 can be replaced without removing side cover 102 from the overall assembly.

A pressure side filter 112 includes a pressure side filter element 113 contained within a pressure side filter element cover or cap 114 adjacent a bypass valve 116 in a pressure side transmission fluid manifold 118 defined within side cover 102. Bypass valve 116 is operatively contained within side cover 102. Pressure side filter element 113 is received in fluid manifold 118, and pressure side filter element cover or cap 114 surrounds an otherwise exposed distal portion of filter element 113. Pressure side filter element cover or cap 114 is suitably connected to side cover 102 by appropriate fasteners, or by direct threaded or other engagement between cover 102 and cover or cap 114. Accordingly, pressure side filter element cover 114 and pressure side filter element 113 contained therein are externally accessible in the overall arrangement of side cover assembly 100. Pressure side filter element 113 is easily replaced by disengaging filter element cover 114 without a need for disengaging side cover 102 from the overall side cover assembly 100. Filter element 113 is positioned for easy removal and replacement.

Also accessible externally of plastic side cover 102 is a cooler 120, which is connected to side cover 102 by suitable fasteners, or by suitable direct connection. Cooler 120 is in fluid flow communication by way of fluid pathways to be described subsequently herein, as are suction side filter compartment 104 and pressure side filter 112.

Side cover 102 can be made from suitable plastic material by known molding techniques. Accordingly, side cover 102 can be formed with suitable configurations for receiving the additional components of side cover assembly 100, such as suction side filter body 106 and filter element flange 110 thereof, pressure side filter element 113, pressure side filter element cover 114, bypass valve 116 and cooler 120; each arranged in a suitable manner so as to provide easy access thereto for maintenance and service procedures.

Further, however, plastic side cover 102 can be formed with the necessary fluid pathways or conduits for routing transmission fluid to and from a valve body of a transmission to which side cover 102 is attached, and to, from and among the various components of side cover 102, such as the aforedescribed suction side filter compartment 104 and pressure side fluid manifold 118. With the fluid pathways formed integrally in cover 102 during the molding process of cover 102, modular transmission side cover assembly 100 is a fully integrated, one-piece, bolt-on system module. As a module, it provides direct pump and valve body connections integral to side cover 102. Integrated fluid routing within side cover 102 minimizes the risk of fluid leakage, simplifies assembly and reduces size by eliminating the need for, installation of and connection to internal tubes or hoses.

Figure 3:
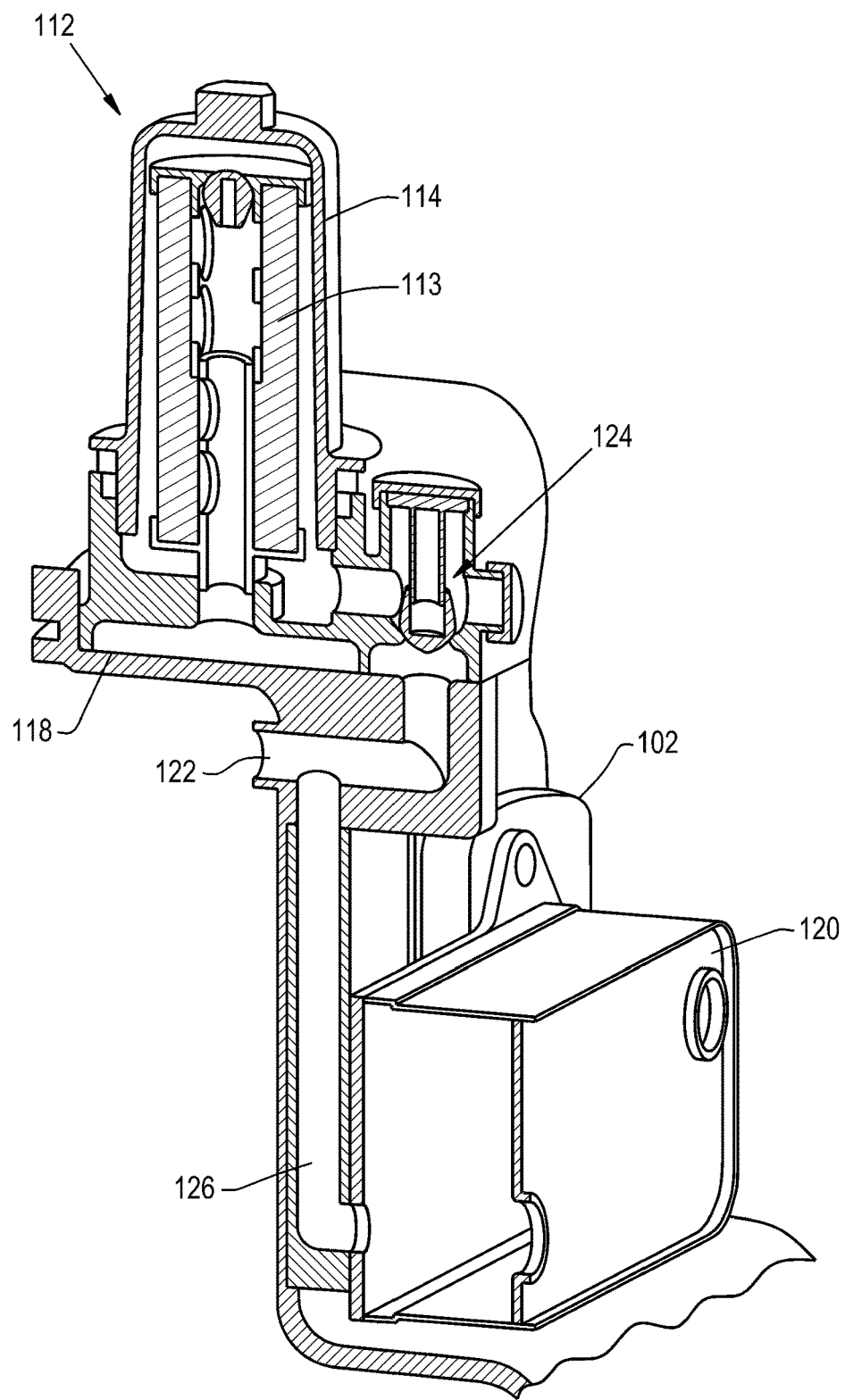
FIG. 3 is a fragmentary cross-sectional view through the modular transmission side cover assembly, taken along line 3-3 of FIG. 1.
Figure 4:
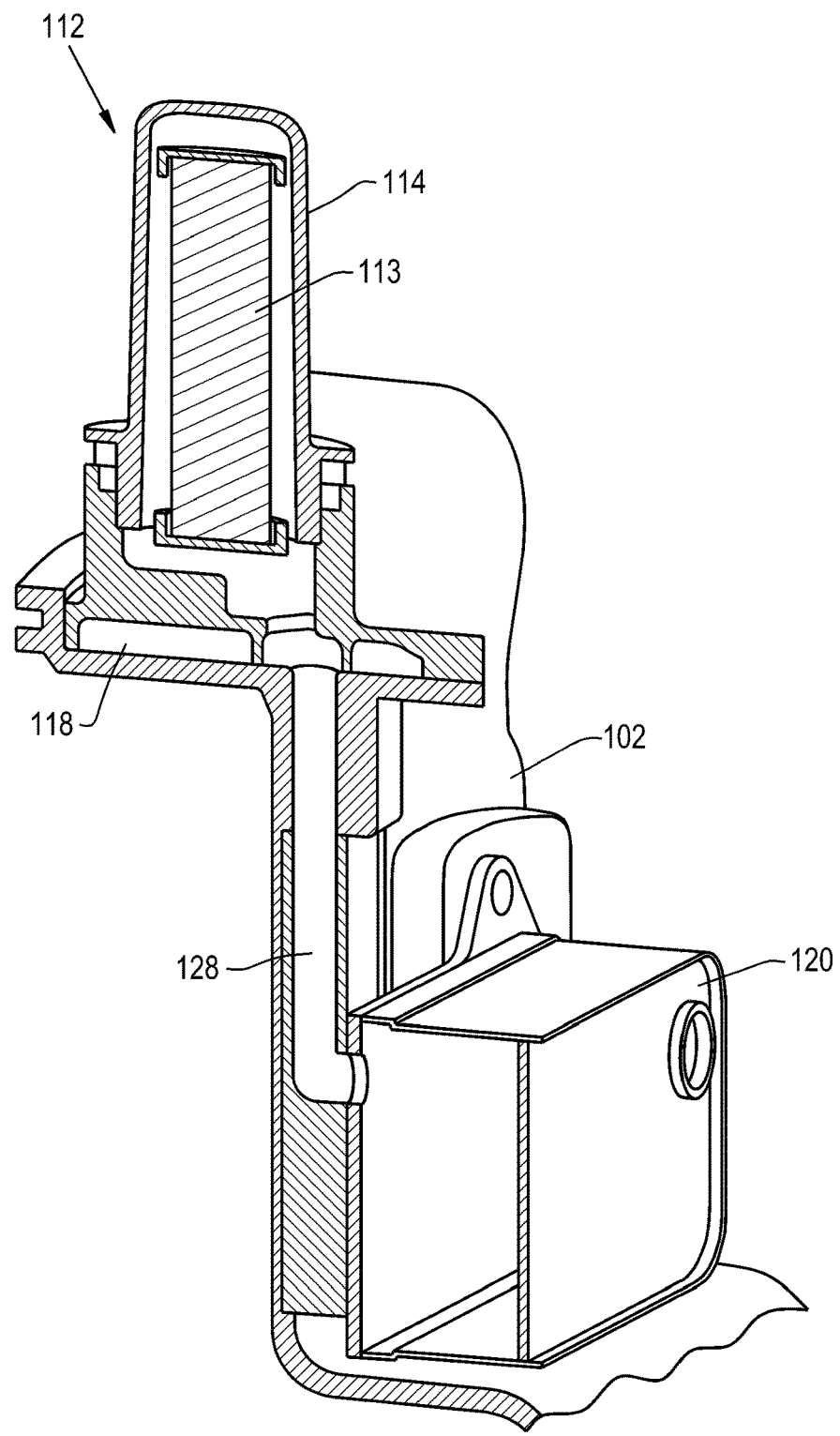
FIG. 4 is a fragmentary cross-sectional view of the modular transmission side cover assembly, taken along line 4-4 of FIG. 1.

FIGS. 3 and 4 are cross-sectional views through the modular transmission side cover assembly 100, taken along different lines so as to expose some of the integral, internal fluid paths formed in the plastic material of side cover 102. As can be seen in FIGS. 3 & 4, a fluid channel or path 122 conducts fluid from an automatic transmission valve body to a pressure relief valve 124, with a branch fluid channel or branch fluid path 126 from fluid channel or path 122 extending fluid flow communication to cooler 120. Another fluid channel or path 128 formed integrally within the body of side cover 102 extends from pressure side filter manifold 118 to cooler 120.

Figure 5:
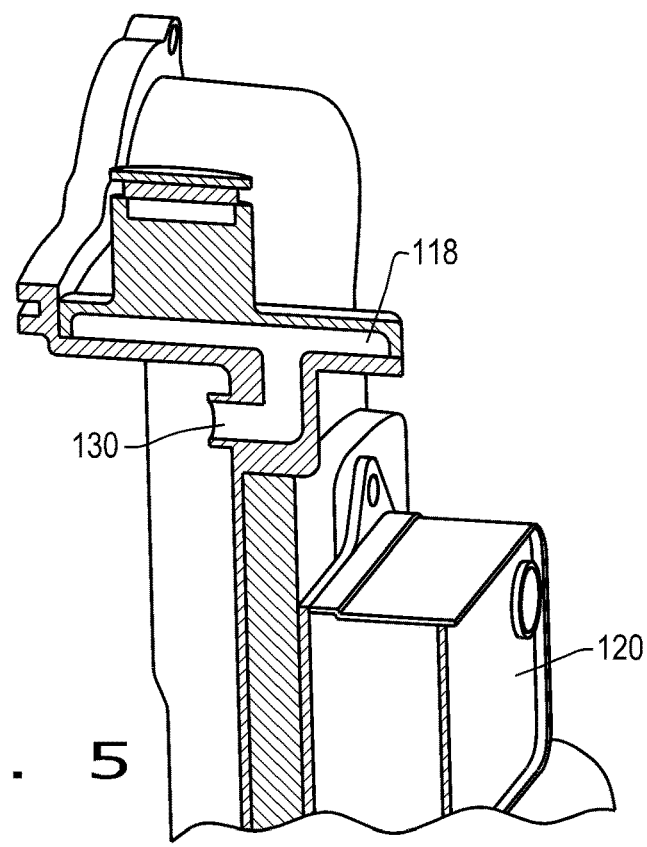
FIG. 5 is a fragmentary view of the modular transmission side cover, in partial cross-section, taken generally along line 5-5 of FIG. 1.

FIG. 5 is yet another fragmentary cross-sectional view through side cover 102, showing yet another fluid channel or path 130 formed integrally in plastic side cover 102. Fluid channel or path 130 establishes fluid flow communication from external components to pressure side filter manifold 118, and therefore to pressure side filter 112.

Figure 6:
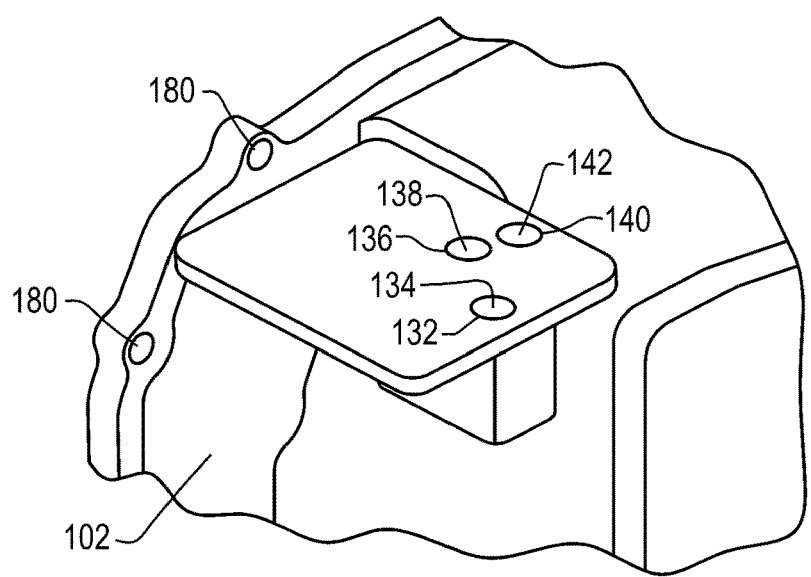
FIG. 6 is a fragmentary perspective view of the side cover.

FIG. 6 is a fragmentary perspective view showing external ports and fluid flow paths molded directly into side cover 102 for conducting transmission fluid among various components in modular transmission side cover assembly 100. A first port 132 leads to a fluid channel or path 134 from a valve body of an overall automatic transmission assembly to cooler 120 held on the outside of side cover 102. A second port 136 leads to a fluid channel or path 138 from cooler 120 to pressure side filter 112. A third port 140 leads to a fluid channel or path 142 between pressure side filter 112 and the aforementioned valve body.

Figure 7:
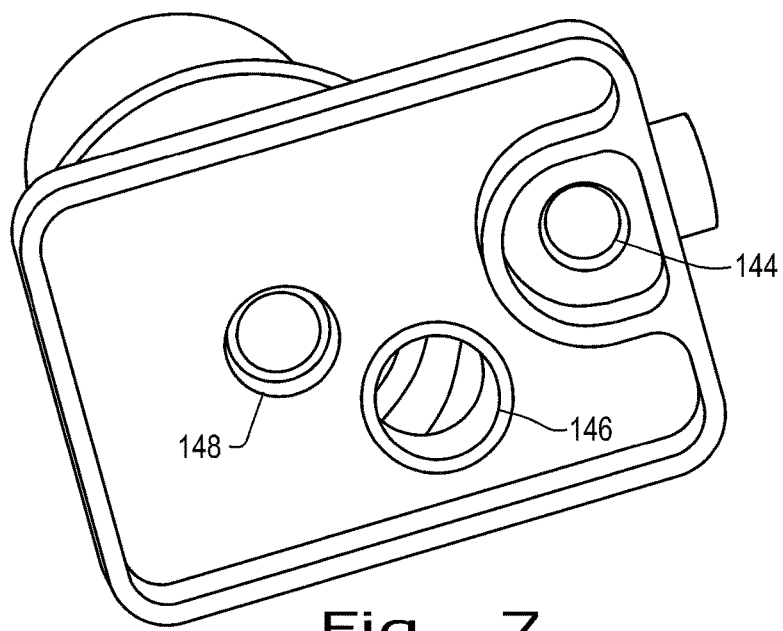
FIG. 7 is a perspective view of the bottom of the pressure side filter manifold in the side cover assembly.

FIG. 7 is a perspective view of the bottom of the pressure side filter manifold, showing the opposite ends of the same fluid paths depicted in FIG. 6. Accordingly, a first internal port 144 is in fluid flow communication with fluid channel or path 134, a second in terminal port 146 is in fluid flow communication with fluid channel or path 138 and a third internal port 148 is in fluid flow communication with fluid channel or path 142.

Figure 8:
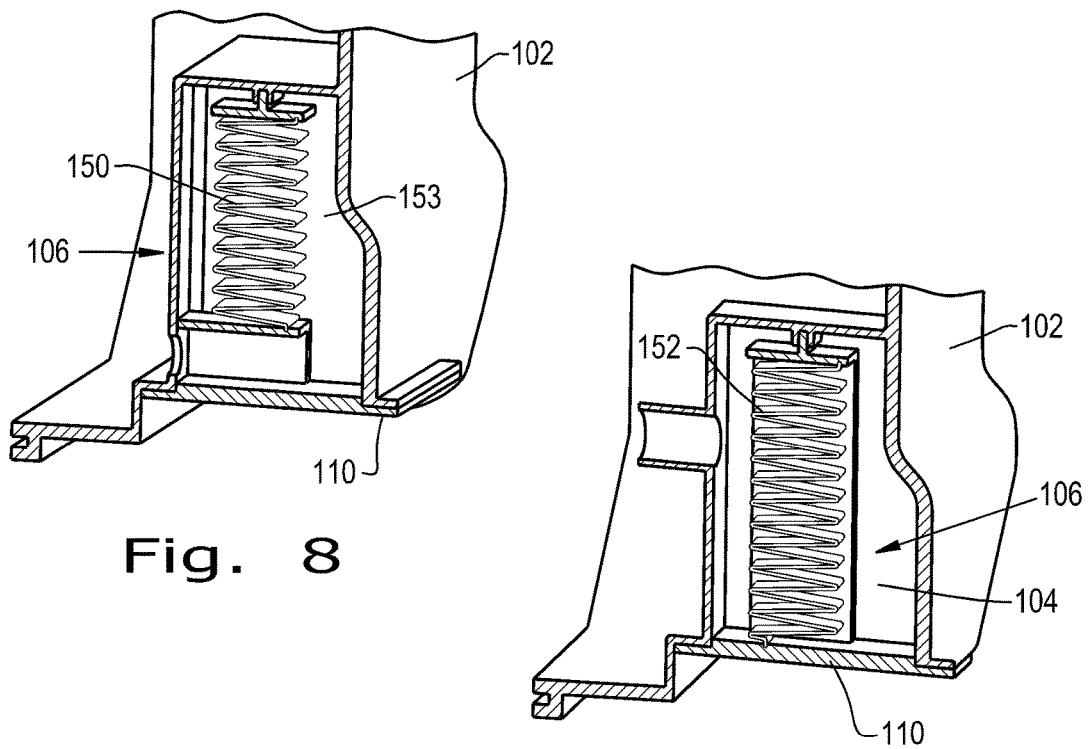
FIG. 8 is fragmentary cross-sectional view of the side cover assembly, taken along line 8-8 of FIG. 1.
Figure 9:
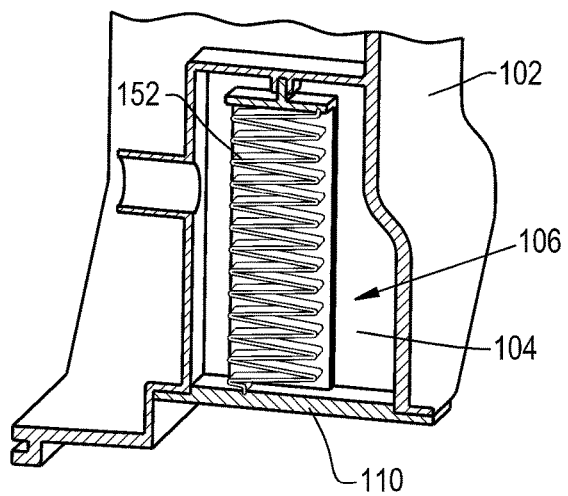
FIG. 9 is another fragmentary cross-sectional view similar to that of FIG. 8, but on a different cross-sectional plane, indicated as line 9-9 in FIG. 1.

FIGS. 8 & 9 are cross-sectional views through suction side filter compartment 104 and suction side filter body 106 therein, better illustrating the constructions thereof. Suction side filter body 106 includes a mechanical pump suction filter element 150 and electric pump suction filter element 152, each supplied separately by way of fluid flow pathways established within side cover 102. Mechanical pump suction filter element 150 and electric pump suction filter element 152 are separated from one another by a barrier 153 that engages internal surfaces of suction side filter compartment 104 to prevent cross flow of transmission fluid, thereby establishing separate and distinct filter components for the mechanical pump and electric pump respectfully.

Figure 10:
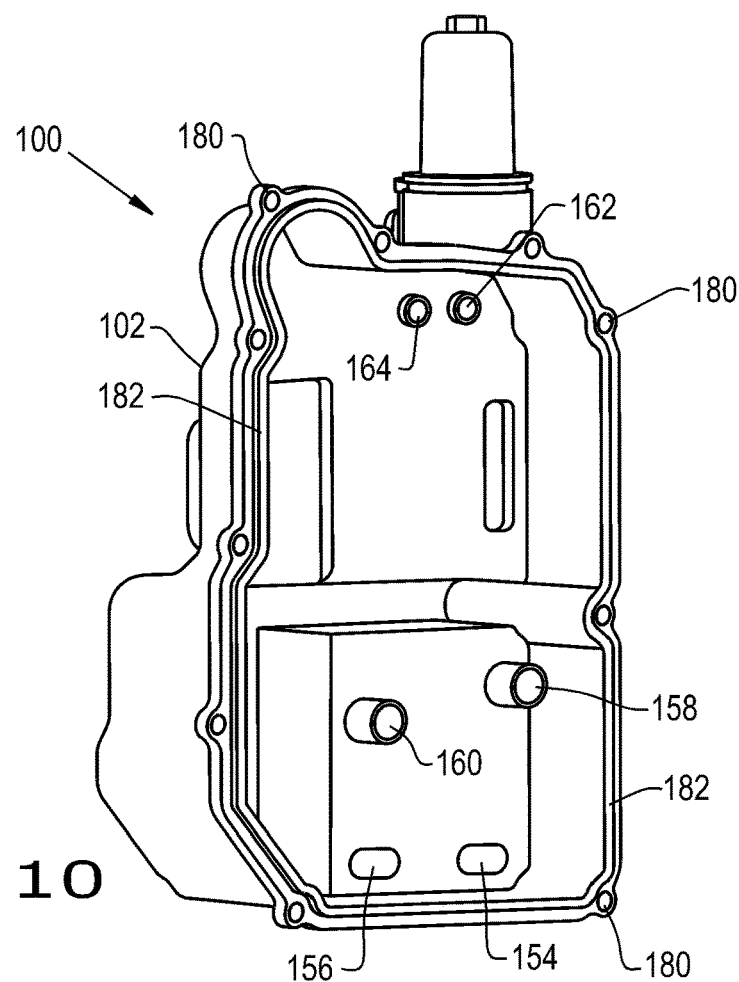
FIG. 10 is perspective view of the side cover assembly, similar to FIG. 1, and but illustrating the side opposite the side shown in FIG. 1.

FIG. 10 is a perspective view of plastic side cover 102, better depicting the valve body pressure side supply and return connections to suction side filter compartment 104, and the separate mechanical pump suction filter element 150 and electric pump suction filter element 152 contained therein, as well as supply and return connections to and from the pressure side filter 112. Accordingly, suction filter fluid inlets 154, 156 and suction filter fluid outlets 158, 160 are provided for establishing flow to and from suction side filter compartment 104 in the regions of mechanical pump suction filter element 150 and electric pump suction filter element 152, respectively, generally on opposite side of barrier 153. That is, suction filter fluid inlet 154 and suction filter fluid outlet 158 for mechanical pump suction filter element 150 are provided on one side of barrier 153, and suction filter fluid inlet 156 and suction filter fluid outlet 160 for electric pump suction filter element 152 are provided on the opposite side of barrier 153. Also as shown in FIG. 10, valve body pressure side supply and return connections 162, 164 are provided to and from pressure side filter 112.

Figure 11:
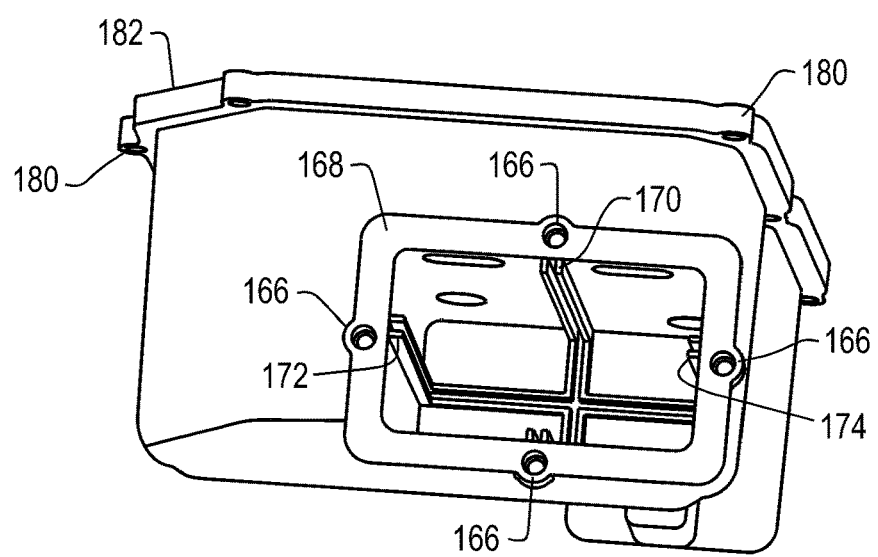
FIG. 11 is another perspective view of the side cover alone, illustrating the suction filter compartment in the side cover.

FIG. 11 is a perspective view of the bottom of plastic side cover 102, better depicting suction filter compartment 104 and the locations of female threaded engagement holes 166 for machine screws 108 that retain suction side filter body 106 in compartment 104. It should be understood that threaded engagement holes 166 can be comprised of threaded inserts molded into or otherwise inserted into side cover 102 along or adjacent to a seating surface 168 engaging filter element flange 110. Also shown in FIG. 11 is a slot or channel 170 for receiving barrier 153 to thereby separate suction filter compartment 104 into separate sub compartments for mechanical pump suction element 150 and electrical pump suction element 152. Side slots or channels 172, 174 receive side supports 176, 178 of filter body 106.

It should be understood that the interface between side cover 102 and filter element flange 110, generally along seating surface 168 can include a suitable gasket or other sealing material, to provide a fluid tight connection of filter element flange 110 to seating surface 168. Alternatively, the interface surface of one or the other can include a permanent layer of suitable material to provide the required seal. Those skilled in the art will understand readily the types of materials and/or structures suitable for providing fluid tight engagements between the components. It should be understood further that other interfaces between components described herein can include similar structures to provide a fluid tight seal, as required. For example, pressure side filter element cover 114 also establishes a fluid tight connection to side cover 102, by the use of a gasket, suitable materials and/or suitable structures.

Modular transmission side cover assembly 100 is connected to a transmission valve body or other transmission subassembly, and includes a plurality of flange through holes 180 with torque limiters therein for receiving bolts or other fasteners by which attachment is made. The various fluid channels or paths described above for modular transmission side cover assembly 100 align with the corresponding features of the other transmission assemblies so the transmission fluid flow there from can pass directly to the aforedescribed components of modular transmission side cover assembly 100 and from assembly 100 on to the other components of the transmission. Again, a suitable gasket, sealing material or structure can be provided along an interface surface 182 for establishing a fluid tight connection as necessary.

The modular transmission side cover assembly disclosed herein provides a fully integrated, one-piece, bolt-on module for automatic transmissions. Direct pump and valve body connections are provided integral to the side cover. Serviceable pressure and suction filter elements are provided with direct accessibility without having to remove the housing cover. Previously used, complicated circuits of discrete hydraulic lines are simplified by the integral fluid flow paths within the molded cover. The overall arrangement is compact and efficient, yet flexible in concept.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A transmission side cover assembly, comprising:
   a side cover including formations that are configured to connect with a transmission, said side cover defining a fluid manifold;
   one or both of at least one filter or a cooler retained by said side cover;
   at least one fluid channel integrally formed in said side cover establishing fluid flow communication to said one or both of said at least one filter or said cooler;
   a filter element cap connected to said side cover and in fluid flow communication with said fluid manifold; and
   a filter element disposed in said filter element cap;
   said side cover configured to provide external accessibility to said one or both of said at least one filter or said cooler when said side cover is connected to said transmission,
   wherein said one or both of said at least one filter or said cooler are configured to be removed from said side cover without removing said side cover from said transmission.

2. The transmission side cover assembly of claim 1, said side cover defining a filter compartment having an inlet and an outlet;
   said at least one filter including a transmission fluid filter body disposed in said filter compartment; and
   said at least one fluid channel including filter compartment fluid channels integrally formed in said side cover establishing fluid flow communication to said filter compartment inlet and from said filter compartment outlet.

3. The transmission side cover assembly of claim 2, said transmission fluid filter body including a first filter element, a second filter element and a fluid barrier between said first and second filter elements.

4. The transmission side cover assembly of claim 1, said at least one filter including a first filter retained by said side cover and said at least one fluid channel having first filter fluid channels connected thereto in fluid flow communication, said first filter fluid channels being integral with said side cover.

5. The transmission side cover assembly of claim 4, said at least one filter further including a second filter retained by said side cover and said at least one fluid channel having second filter fluid channels connected thereto in fluid flow communication, said second filter fluid channels being integral with said side cover.

6. The transmission side cover assembly of claim 5, further including said cooler attached to said side cover, and fluid channels to and from said cooler integral in said side cover.

7. The transmission side cover assembly of claim 5, one of said first filter and said second filter including a filter compartment formed in said side cover, and a filter body contained in said filter compartment.

8. The transmission side cover assembly of claim 7, said filter body including a first filter element, a second filter element and a fluid barrier disposed between said first and second filter elements.

9. The transmission side cover assembly of claim 1, said at least one filter including a first filter element secured to said side cover by threaded fasteners.

10. The transmission side cover assembly of claim 9, said side cover defining a suction side filter compartment, and said first filter element being disposed in said suction side filter compartment.

11. The transmission side cover assembly of claim 1, including:
a suction side filter compartment formed in said side cover;
said at least one filter including a suction side filter body disposed in said suction side filter compartment;
said cooler connected to said side cover; and
said at least one fluid channel including fluid channels integrally formed in said side cover establishing fluid flow communication to said suction side filter compartment, said pressure side filter, and said cooler.

12. The transmission side cover assembly of claim 11, said side cover defining flange through holes for receiving torque limiters and fasteners connecting said transmission side cover assembly to said transmission.

13. The transmission side cover assembly of claim 11, said suction side filter body including a mechanical pump suction element, an electric pump suction element and a fluid flow barrier between said suction elements.

14. The transmission side cover assembly of claim 13, said suction side filter compartment defining an internal slot, and said fluid flow barrier being disposed in said internal slot.

15. The transmission side cover assembly of claim 13, including separate fluid inlet and outlet paths for said mechanical pump suction element and said electric pump suction element.

16. A transmission side cover assembly, comprising:
a side cover including formations that are configured to connect with a transmission;
one or both of at least one filter or a cooler retained by said side cover, said at least one filter including a first filter retained by said side cover and a second filter retained by said side cover;
at least one fluid channel integrally formed in said cover establishing fluid flow communication to said one or both of said at least one filter or said cooler, said at least one fluid channel having first filter fluid channels and second filter fluid channels connected thereto in fluid flow communication, said first filter fluid channels and said second filter fluid channels being integral with said side cover,
said side cover configured to provide external accessibility to said one or both of said at least one filter or said cooler when said side cover is connected to said transmission,
wherein said one or both of said at least one filter or said cooler are configured to be removed from said side cover without removing said side cover from said transmission.

17. The transmission side cover assembly of claim 16, further including said cooler attached to said side cover, and fluid channels to and from said cooler integral in said side cover.

18. The transmission side cover assembly of claim 16, one of said first filter and said second filter including a filter compartment formed in said side cover, and a filter body contained in said filter compartment.

19. The transmission side cover assembly of claim 18, said filter body including a first filter element, a second filter element, and a fluid barrier disposed between said first and second filter elements.

20. A transmission side cover assembly, comprising:
a side cover including formations that are configured to connect with a transmission, said side cover defining a filter compartment having an inlet and an outlet;
one or both of at least one filter or a cooler retained by said side cover, said at least one filter including a transmission fluid filter body disposed in said filter compartment, said transmission fluid filter body including a first filter element, a second filter element, and a fluid barrier between said first and second filter elements ;
at least one fluid channel integrally formed in said cover establishing fluid flow communication to said one or both of said at least one filter or said cooler, said at least one fluid channel including filter compartment fluid channels integrally formed in said side cover establishing fluid flow communication to said filter compartment inlet and from said filter compartment outlet,
said side cover configured to provide external accessibility to said one or both of said at least one filter or said cooler when said side cover is connected to said transmission,
wherein said one or both of said at least one filter or said cooler are configured to be removed from said side cover without removing said side cover from said transmission.

* * * * *